United States Patent
Oosterling

(10) Patent No.: US 8,258,646 B2
(45) Date of Patent: Sep. 4, 2012

(54) TOWER FOR A WIND TURBINE

(75) Inventor: Pieter Adriaan Oosterling, Waterlandkerkje (NL)

(73) Assignee: Wind En Water Technologie Holding BV, Schoondijke (NL)

( * ) Notice: Subject to any disclaimer, the term of this patent is extended or adjusted under 35 U.S.C. 154(b) by 289 days.

(21) Appl. No.: 12/734,835

(22) PCT Filed: Nov. 25, 2008

(86) PCT No.: PCT/EP2008/066139
§ 371 (c)(1), (2), (4) Date: May 26, 2010

(87) PCT Pub. No.: WO2009/068521
PCT Pub. Date: Jun. 4, 2009

(65) Prior Publication Data
US 2010/0301613 A1 Dec. 2, 2010

(30) Foreign Application Priority Data
Nov. 27, 2007 (EP) .................................. 07121682

(51) Int. Cl.
*F03D 9/00* (2006.01)
(52) U.S. Cl. .......................................... 290/55; 290/44
(58) Field of Classification Search ............... 290/44, 290/55
See application file for complete search history.

(56) References Cited

U.S. PATENT DOCUMENTS

| 4,366,386 A | * | 12/1982 | Hanson | 290/44 |
| 2006/0006658 A1 | * | 1/2006 | McCoin | 290/55 |
| 2006/0267348 A1 | * | 11/2006 | Weitkamp et al. | 290/55 |
| 2007/0108776 A1 | * | 5/2007 | Siegfriedsen | 290/55 |

FOREIGN PATENT DOCUMENTS

| DE | 830 180 C | 1/1952 |
| DE | 42 36 092 A1 | 4/1994 |
| DE | 44 32 800 A1 | 3/1996 |
| WO | WO 2005/021897 A | 3/2005 |

OTHER PUBLICATIONS

PCT International Search Report dated Nov. 6, 2009 in connection with PCT International Patent Application No. PCT/EP2008/066139, 2 pages.

* cited by examiner

*Primary Examiner* — Tho D Ta
(74) *Attorney, Agent, or Firm* — Rothstein & Ebenstein LLP

(57) ABSTRACT

The invention concerns a tower for a wind turbine which tower supports a nacelle with bearings in which a horizontal rotation axis with blades can rotate, the tower comprises a steel wall of circular section, a drive for rotating the nacelle around a vertical axis of the circular section and at the bottom of the tower foundation means for supporting the tower in upright position. In accordance with the invention the foundation means comprises a bearing on a base which bearing supports the tower and a support ring positioned by three or more legs above the base for keeping the tower upright wherein in the support ring rollers or wheels press against the steel wall of circular section.

16 Claims, 2 Drawing Sheets

TOWER FOR A WIND TURBINE

CROSS-REFERENCE TO RELATED APPLICATIONS

Figure 1:
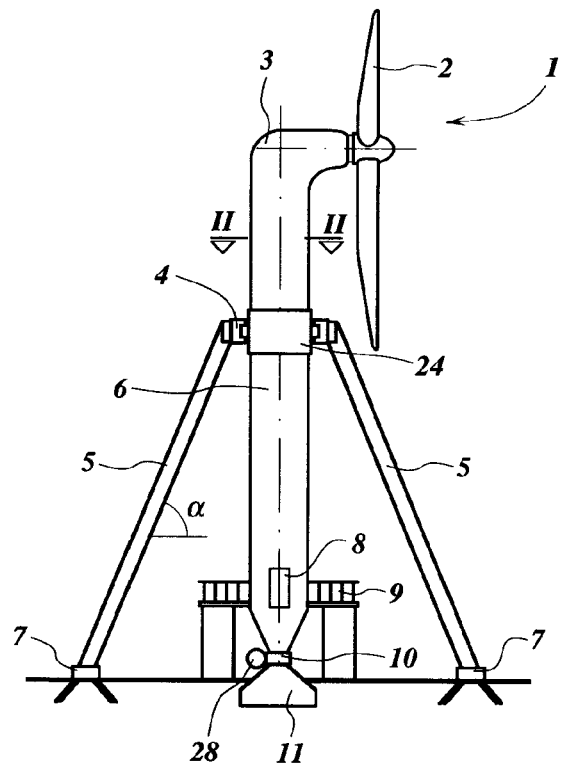

This application is a national stage entry under 35 U.S.C. §371 of PCT International Patent Application No. PCT/EP2008/066139, filed Nov. 25, 2008, and claims priority to European Patent Application No. EP 07121682.4, filed Nov. 27, 2007, the contents of which are incorporated herein by reference in their entirety into the subject application.

The invention concerns a tower for a wind turbine in accordance with the preamble of claim 1. Such towers often have a cylindrical or slightly conical shape with a closed outside circumference and are often used as they can be manufactured in an easy way and have limited maintenance costs as painting can be done in an efficient way. The disadvantage of the known towers is that with increasing height of the wind turbines and the increasing diameter of the turbine blades due to the increased load caused by the horizontal force on the turbine blades the diameter of the tower at the bottom has to increase to a diameter that makes road transport of the bottom sections of the towers impossible. This leads to the need of assembling these bottom sections at the building site which leads to additional costs and reduced quality.

In order to overcome this disadvantage the tower is according to claim 1. By adding a support ring around the tower the horizontally directed forces on the tower can be directed to the foundation without inducing a high torque in the steel wall of the tower near the bottom, so that the diameter of the tower remains limited.

In accordance with an embodiment the tower is according to claim 2. In this way the horizontal force on the bearing and the base is more or less similar to the horizontal force on the turbine blades.

In accordance with an embodiment the tower is according to claim 3. In this way the legs form a stable support for the support ring.

In accordance with an embodiment the tower is according to claim 4. In this way the production and maintenance of the tower can be done efficiently and the inside of the tower has sufficient room for equipment.

In accordance with an embodiment the tower is according to claim 5. In this way the rotation of the tower is effected in a simple way.

In accordance with an embodiment the tower is according to claim 6. In this way the drive is easy accessible.

In accordance with an embodiment the tower is according to claim 7. In this way the tower can be positioned in a predetermined direction without the need of additional brakes.

In accordance with an embodiment the tower is according to claim 8. In this way the rollers or wheels do not deform the steel wall of the tower under high wind loads.

In accordance with an embodiment the tower is according to claim 9. In this way the strength and the resistance against corrosion of the outside surface of the steel wall are improved.

In accordance with an embodiment the tower is according to claim 10. In this way the strength and the resistance against corrosion of the rollers are improved.

In accordance with an embodiment the tower is according to claim 11. In this way alignment requirements of the rollers or wheels are reduced.

In accordance with an embodiment the tower is according to claim 12. In this way the play between the rollers or wheels and the outside wall of the tower can be adjusted.

In accordance with an embodiment the tower is according to claim 13. In this way the adjustment of the play is obtained in an easy way.

In accordance with an embodiment the tower is according to claim 14. In this way the load on the rollers or wheels is minimized as much as possible.

In accordance with an embodiment the tower is according to claim 15. In this way access to the rollers or wheels and possible the drive is easy.

In accordance with an embodiment the tower is according to claim 16. In this way the maintenance of all equipment is within reach without the need to climb in the tower.

Figure 2:
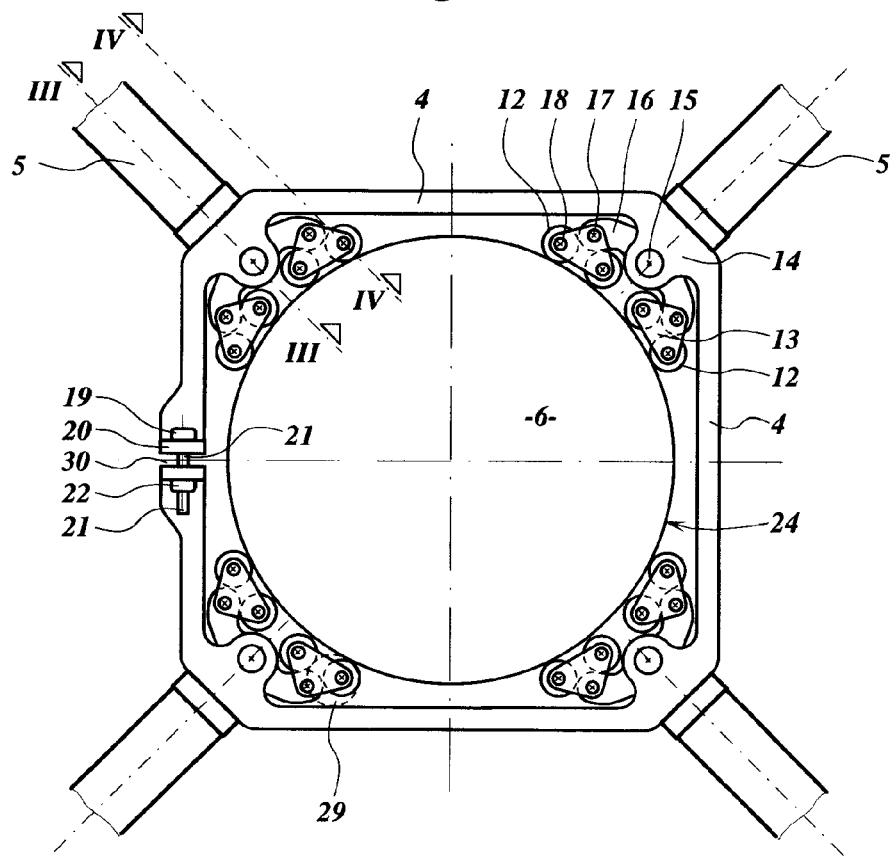
Figure 3:
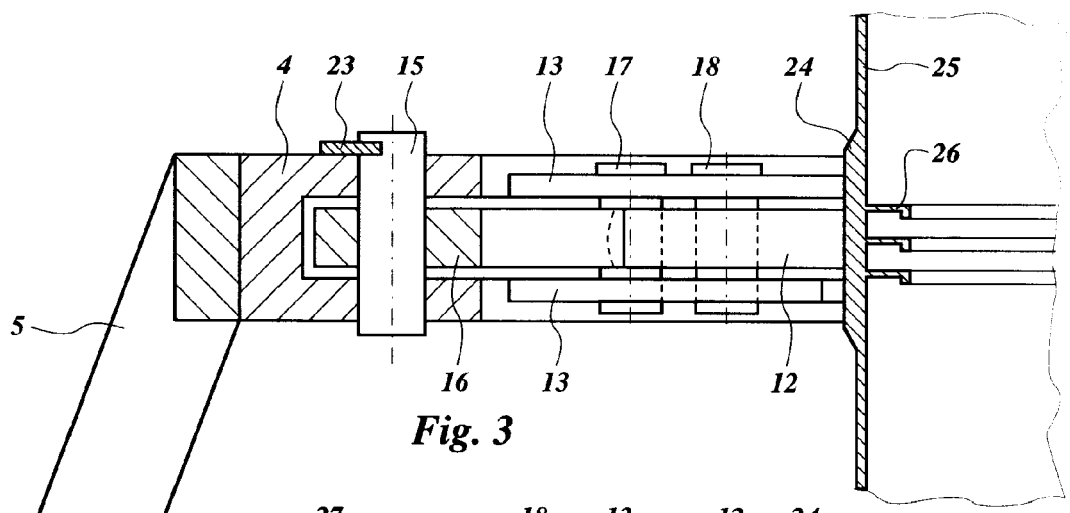
Figure 4:
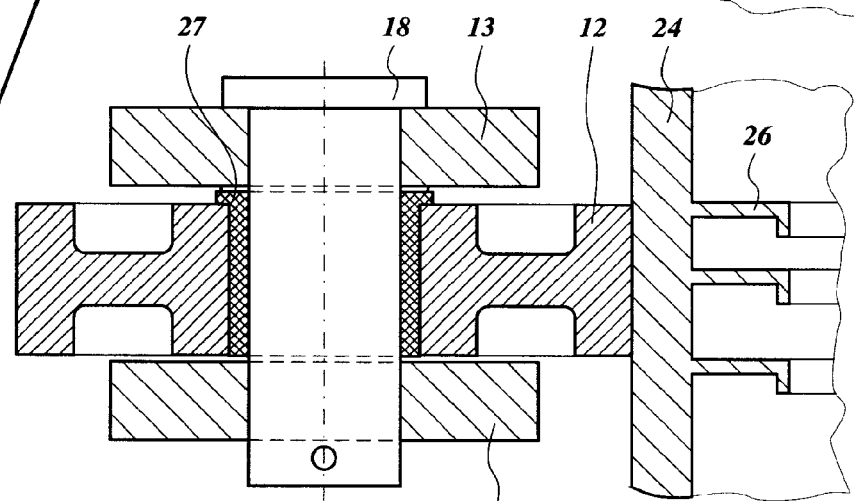
Figure 5:
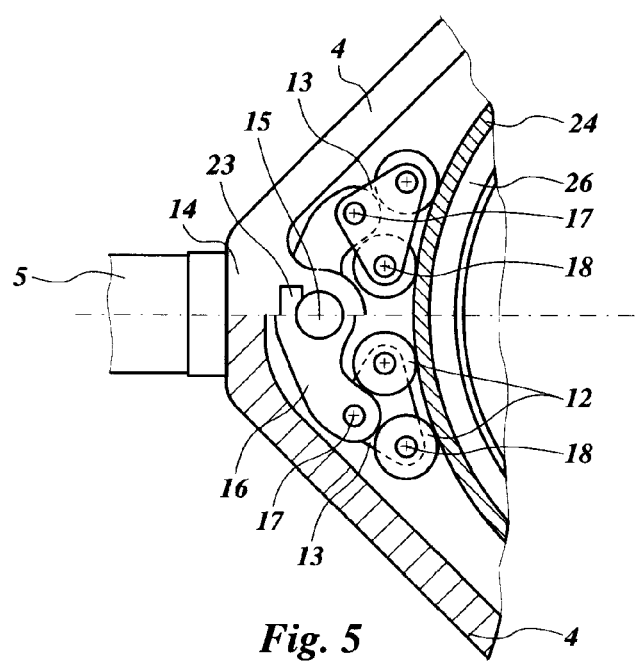

The invention is explained by describing several embodiments of the invention with the aid of a drawing. In the drawing FIG. 1 shows schematically a side view of a wind turbine with a tower supported sideways by a support ring, FIG. 2 shows a top view II-II of the support ring of FIG. 1, FIG. 3 shows section III-III of the support ring shown in FIG. 2, FIG. 4 shows section IV-IV of the support ring of FIG. 2, and FIG. 5 shows in top view and partly as section a detail of the support ring of FIG. 2.

FIG. 1 shows a wind turbine 1 with blades 2 that can rotate around a more or less horizontal rotation axis.

The bearings supporting the rotation axis and the blades 2 are mounted in a nacelle 3 which is mounted on top of a tower 6. A base 11 supports the tower 6 and a bearing 10 between the base 11 and the tower 6 makes it possible to turn the tower 6 so that blades 2 can face the wind. At a height approximately halfway between the nacelle 3 and the ground a support ring 4 is located around the tower 6 and this support ring 4 keeps the tower 6 in upright position. In the shown embodiment four legs 5 support and position the support ring 4 at a height which is approximately halfway the height of the nacelle 3 and preferably the height is between one third and two thirds of the height of the nacelle 3. In other embodiments the number of legs 5 can be three or five or more.

A leg support 7 supports and holds the lower end of a leg 5, the upper end of the leg 5 is fastened to the support ring 4. The leg supports 7 are located around the base 11 at such a distance that the legs 5 have a leg angle $\alpha$ with the horizontal plane wherein the leg angle $\alpha$ is advantageously between 60 and 80 degrees, for instance approximately 70 degrees. The leg supports 7 and the legs 5 are designed such that they can exert a pulling and a pushing force on the support ring 4. This construction wherein the support ring 4 holds the tower 6 vertical and the horizontal forces on the support ring 4 are guided via the legs 5 at leg angle $\alpha$ of approximately 70 degrees makes it possible to design a cylindrical steel tower 6 with a smaller maximum diameter.

The force generated by the wind on the blades 2, the nacelle 3 and the tower 6 is transferred via the support ring 4 and the legs 5 to the leg supports 7 and the ground without inducing a bending torque at the bottom of the tower 6. The bending torque in the tower 6 has it maximum near the support ring 4. This makes it possible to have a tower 6 with a diameter which is at the bottom of the tower 6 equal or less than near the top of the tower 6 near the nacelle 3. A cylindrical tower 6 with a more or less constant diameter is possible.

At the bottom of the tower 6 the base 11 with the bearing 10 supports the tower 6 in such a way that the tower 6 can rotate. For rotating the tower 6 there is a drive 28. In order stabilize the rotational position of the tower 6 the drive 28 can be self locking or there is a separate brake for positioning the tower 6 in a specific rotational position. A suitable self locking drive 28 is a worm wheel drive, which can be applied in this situation as the drive 28 can be accessed easily for maintenance as it is near the ground. For entering the inside of the tower 6 the tower has a door 8 which can be accessed via a platform 9.

In an embodiment of the tower 6 the nacelle 3 is at a height of 100 meter above the ground and the blades 2 of the wind turbine 1 have a diameter of 50 meter. The wind turbine 1 generates 1 MWatt power and can exert a horizontal force of 250 kNewton. As a result of the sideways support of the tower 6 by the support ring 4 at the height of approximately 40-50 meters the diameter of the tower 6 can be less than 3,50 meter. This makes road transport possible of rings from which the tower 6 can be assembled.

Equipment for transferring the energy generated by the wind turbine 1 for use in a specific application is located in the tower 6 and rotates with the tower 6 so avoiding complex cabling or lines. The equipment such as a generator for generating electric power, a pump for generating hydraulic power or a compressor for compressing or liquidizing gas can be located in the nacelle 3. In another embodiment the equipment is located at the bottom of the tower 6 so that maintenance of the equipment is easier. In the latter situation there can be an angular transmission at the top of the tower 6 in order to transfer the rotating torque of a horizontal shaft driven by the blades 2 to a vertical shaft along the length of the tower 6.

FIGS. 2-5 show rollers 12 mounted in the support ring 4 and rolling against the outside surface of the tower 6. These rollers 12 keep the tower 6 in its vertical position. At the height of the support ring 4 a wall 25 of the tower 6 has a reinforced cylindrical ring 24 with an increased wall thickness wherein the reinforced ring 24 can have stiffeners 26. The roller 12 rotates around a wheel axis 18 and has a bearing 27 between the roller 12 and the wheel axis 18. The wheel axis 18 is mounted in frame plates 13, wherein in each frame plate 13 two wheel axis 18 are mounted at equal distances from a swivel shaft 17. The two frame plates 13 at both sides of the two rollers 12 can be coupled to form a frame (not shown). The swivel shaft 17 is mounted in a swivel frame 16 wherein each swivel frame 16 has two swivel shafts 17 at equal distances from a frame shaft 15. The frame shaft 15 is mounted in a corner 14 of the support ring 4 near a leg 5. The swivel shaft 17 has a locking plate 23 for positioning in axial direction. In the shown embodiment the forces from the corner 14 of the support ring 4 that act on shaft 17 are equally divided over four rollers 12. In other embodiments there may be more or less rollers 12 connected to the swivel shaft 17 and/or the support ring 4 wherein the design will be such that all rollers 12 are more or less equally loaded and the differences in the loads on the rollers 12 is minimal.

The reinforced ring 24 is cylindrical so that during rotation of the tower 6 the pressure of the rollers 12 against the ring 24 does not change. In the shown embodiment the wall 25 of the tower 6 is more or less cylindrical as well. In other embodiments the shape of the tower 6 above or below the cylindrical ring 24 can be different. For instance the wall 25 can be a polygon in order to ease production of the wall 25.

The force with which the rollers 12 press against the reinforced ring 24 is adjustable. The adjustment can be obtained in several ways, for instance by positioning the frame shaft 15 in a slotted hole (not shown) instead of in a circular hole and pressing the frame shaft 15 with springs (not shown) towards the reinforced ring 24. FIG. 2 shows another embodiment wherein the circumference of the support ring 4 can be changed. Between two locations in which a frame shaft 15 is mounted the support ring 4 is interrupted by a gap 30. On both sides of the gap 30 is a flange 20. The flanges 20 are coupled by a tensioning bar 21 with a head 19 and a nut 22. If necessary there is a spring (not shown) between the head 19 or the nut 22 and a flange 20. Shortening the tensioning bar 21 increases the pressure between the rollers 12 and the reinforced ring 24.

The worm wheel drive 28 as shown in FIG. 1 is one of the embodiments for turning the wind turbine 1 towards the wind. FIG. 2 shows in interrupted lines a roller drive 29 that is coupled to one or more of the rollers 12 and that can turn the tower 6. For holding the wind turbine 1 in a specific direction the roller drive 29 is provided with a brake (not shown).

The rollers or wheels 12 are massive from steel or synthetic material or from steel with a massive rubber or polyurethane tire (not shown). The outside circumference of the reinforced ring 24 is coated in a way that prevents forming of rust. A suitable coating of the reinforced ring 24, which might be of refined steel, can be a ceramic or metallic layer with improved wear properties, such as a high performance thin film hard coating. Examples are a vapor deposited TiN coating or a thermal spray coating. In situations wherein steel rollers 12 are in direct contact with the reinforced ring 24 the contact surface of the rollers 12 can be provided with the same or similar coating.

For maintenance of the rollers 12 and their frames connecting them to the support ring 4 can have a platform (not shown) that is accessible from the inside of the tower 6.

The invention claimed is:

1. Tower for a wind turbine (1) which tower (6) supports a nacelle (3) with bearings in which a horizontal rotation axis with turbine blades (2) can rotate, the tower comprises a steel wall (24) of circular section, a drive (28;29) for rotating the nacelle around a vertical axis of the circular section and at the bottom of the tower foundation means (7,11) for supporting the tower in upright position characterized in that the foundation means comprises a bearing (10) on a base (11) which bearing supports the tower (6) and a support ring (4) positioned by three or more legs (5) above the base for keeping the tower in upright position wherein in the support ring rollers or wheels (12) press against the steel wall (24) of the circular section.

2. Tower in accordance with claim 1 wherein the support ring (4) is at a height between one third and two thirds and preferably at half of the height of the nacelle (3) above the ground.

3. Tower in accordance with claim 1 wherein the legs make an angle ($\alpha$) of 60 to 80 degrees with the horizontal plane.

4. Tower in accordance with claim 1, wherein the tower (6) is cylindrical over the greater part of its height.

5. Tower in accordance with claim 1 wherein the drive (29) rotates at least one of the rollers (12).

6. Tower in accordance with claim 1 wherein the drive (28) is located on the base (11).

7. Tower in accordance with claim 5 wherein the drive (28) is self locking with for instance a worm gear.

8. Tower in accordance with claim 1 wherein at the height of the support ring (4) the steel wall (24) of circular section has an increased wall thickness and/or additional stiffeners (26).

9. Tower in accordance with claim 1 wherein the steel wall (24) of circular section has a metallic or ceramic coating.

10. Tower in accordance with claim 1 wherein the outside circumferences of the rollers or wheels (12) have a metallic or ceramic coating.

11. Tower in accordance with claim 1 wherein the rollers or wheels (12) have solid rubber or similar tires.

12. Tower in accordance with claim 1 one of the previous claims wherein the support ring (4) has tension means (19, 20,

21, 22) for increasing the pressure between the rollers or wheels (12) and the steel wall (24) of circular section.

13. Tower in accordance with claim 12 wherein the tension means (19, 20, 21, 22) can change the circumference of the support ring (4).

14. Tower in accordance with claim 1 wherein the rollers or wheels (12) are mounted in one or more frames (13,16) for equalizing the force between a roller or wheel and the steel wall (24) of circular section.

15. Tower in accordance with claim 1 wherein the support ring (4) is provided with a platform around the tower (6) that can be accessed through a door from the inside of the tower (6).

16. Tower in accordance with claim 1 wherein equipment driven by the blades (2) is located at the bottom of the tower (6) and a shaft connects the blades and the driven equipment via one or more angular transmissions.

* * * * *